United States Patent
Yamazaki et al.

[11] Patent Number: 5,856,649
[45] Date of Patent: Jan. 5, 1999

[54] LASER BEAM MACHINE

[75] Inventors: Etsuo Yamazaki, Kitatsuru-gun; Yoshinori Nakata, Minamitsuru-gun; Kazuhiro Suzuki, Minamitsuru-gun; Atsushi Mori, Minamitsuru-gun, all of Japan

[73] Assignee: Fanuc Ltd., Yamanashi, Japan

[21] Appl. No.: 919,171

[22] Filed: Aug. 28, 1997

Related U.S. Application Data

[63] Continuation of Ser. No. 525,778, filed as PCT/JP95/00056 Jan. 18, 1995 published as WO95/23046 Aug. 31, 1995, abandoned.

[30] Foreign Application Priority Data

Feb. 25, 1994 [JP] Japan ................................. 6-027119

[51] Int. Cl.⁶ .................................................. B23K 26/08
[52] U.S. Cl. .............................. 219/121.67; 219/121.78; 364/474.08
[58] Field of Search ........................... 219/121.6, 121.67, 219/121.71, 121.7, 121.72, 121.78, 121.79, 121.8, 121.81, 121.82; 364/474.08; 318/568.11, 568.15

[56] References Cited

U.S. PATENT DOCUMENTS

| | | |
|---|---|---|
| 4,169,976 | 10/1979 | Cirri . |
| 4,782,438 | 11/1988 | Mizukado et al. ................. 219/121.78 |
| 4,870,560 | 9/1989 | Seki et al. ........................... 219/121.78 |
| 4,914,599 | 4/1990 | Seki et al. . |
| 4,918,611 | 4/1990 | Shyu et al. .......................... 364/474.08 |

FOREIGN PATENT DOCUMENTS

| | | |
|---|---|---|
| 324032 | 7/1989 | European Pat. Off. . |
| 61-38793 | 2/1986 | Japan . |
| 62-296985 | 12/1987 | Japan . |
| 63-295085 | 1/1988 | Japan . |
| 2-20683 | 1/1990 | Japan . |
| 2-63691 | 3/1990 | Japan ................................. 219/121.7 |
| 2-108484 | 4/1990 | Japan ................................. 219/121.71 |
| 2-169194 | 6/1990 | Japan ................................. 219/121.72 |
| 4-33788 | 2/1992 | Japan ................................. 219/121.71 |
| 5-104270 | 4/1993 | Japan ................................. 219/121.7 |
| 5-212546 | 8/1993 | Japan ................................. 219/121.72 |

*Primary Examiner*—Gregory L. Mills
*Attorney, Agent, or Firm*—Staas & Halsey

[57] ABSTRACT

A laser beam machine capable of easily generating a machining path for cutting. A reading device reads a designation code for the shape of a hole to be cut, a size of the hole, a central position of the hole, and a start position and a final stop position of a front end point of a machining head. A smooth path-generating device generates a smooth path from the designation code for the shape of the hole, the size of the hole, the central position of the hole, and the start position and the final stop position, such that the overall path for the front end point of the machining head becomes a smooth one. A machining program-generating device generates a machining program based on the smooth path generated. According to the machining program, the machining head moves to cut the hole through a workpiece.

13 Claims, 8 Drawing Sheets

LASER BEAM MACHINE

This application is a continuation, of application Ser. No. 08/525.778, filed as PCT/JP95/00056 Jan. 18, 1995 published as WO95/23046 Aug. 31, 1995, now abandoned.

BACKGROUND OF THE INVENTION

1. Field of the Invention

This invention relates to a laser beam machine for cutting the shape of a hole according to a machining program, and more particularly to a laser beam machine which is capable of cutting the shape of a hole with an enhanced cutting speed.

2. Description of the Related Art

Conventionally, to machine the shape of a hole through a plate material, such as a steel plate, by a laser beam machine, piercing, i.e. the machining of perforating a small hole, is first carried out, and then cutting is carried out along the shape of the hole.

FIGS. 7 (a) and 7 (b) show examples of conventional machining paths for cutting circular holes. FIG. 7 (a) shows a first example, while FIG. 7 (b) shows a second example. In the the case of FIG. 7 (a) example, the machining head starts to move from a start position A11, and once stops at a central position O11 of a circular hole 110, where laser beam irradiation is started to carry out piercing. After completion of piercing, cutting is started from the central position O11, and continued until the machining head reaches a point H11. From the point H11, the machining head moves along the circumference of the circular hole 110 until it comes to the point H11 again, where the machining head once stops, thereby completing cutting of the hole, and the laser beam irradiation is also stopped. Thereafter, the machining head moves to a final stop position Z11.

In the case of the FIG. 7 (b) example, the machining head starts to move from a start position A12, and directly reaches a point H12 on the circumference of the circular hole 110. The machining head once stops at the point H12, and then the laser beam irradiation is started to carry out piercing. After completion of piercing, cutting is started from the point H12, and the machining head moves along the circumference of the circular hole 110 until it comes to the point H12 again. At the point H12, the machining head once stops, thereby completing cutting of the hole, and the laser beam irradiation is also stopped, followed by the machining head moving to a final stop position Z12.

FIG. 8 (a) and FIG. 8 (b) show examples of conventional machining paths for cutting a slot and a square hole. FIG. 8 (a) shows an example of the machining path for the slot, while FIG. 8(b) an example of the machining path for the square hole. In the case of FIG. 8 (a), the machining head starts to move from a start position A13, and once stops at a central position O13 of a slot 120, followed by starting irradiation of the laser beam for piercing. After completion of piercing, cutting is started from the central position O13, and continued until the machining head reaches a point H13, from which the machining head moves along the periphery of the slot until it comes to the point H13 again, where the machining head once stops, thereby completing cutting of the slot. At the same time, the laser beam irradiation is also stopped. Thereafter, the machining head moves to a final stop position Z13.

In the case of FIG. 8 (b), the machining head starts to move from a start position A14, and once stops at a point I14 within a square hole 130, followed by starting irradiation of the laser beam for piercing. After completion of piercing, cutting is started from the point I14, and continued until the machining head moves to a point H14, from which the machining head moves along the periphery of the square hole 130 until it comes back to the point H14 again, where the machining head once stops, thereby completing cutting of the square hole. At the same time, laser beam irradiation is also stopped. Thereafter, the machining head moves to a final stop position Z14.

In all of the above examples of the machining path, the machining head stops two times, i.e. upon piercing and upon completion of cutting of a hole. Therefore, it is necessary to carry out deceleration and acceleration before and after stoppage of the machining head, requiring the longer time period for machining.

Especially, the machining path shown in FIG. 7 (a) is an ordinary one usually followed in cutting a circular hole, but the machining head undergoes a drastic or sharp turn at the point H11, requiring a rapid acceleration and deceleration on the drive mechanism side. Therefore, a slow-down of the feed rate is inevitable, requiring still the longer time period for machining.

As means for eliminating the above inconvenience in machining, a so-called running piercing is generally known. The running piercing dispenses with positioning of the machining head for piercing, through generation of a smooth path for the overall route for machining. That is, according to the running piercing, piercing is carried out without stopping the machining head at any intermediate point when the machining head is moved from a start position to a cutting start position on the periphery of a hole to be cut. This method of machining permits the drive mechanism to cause continuous cutting without requiring the same of a drastic acceleration and deceleration. Further, when the machining head cuts round the periphery of the hole and returns to the cutting start position, the machining head is caused to move further in an overlapping manner along the part of the periphery, and then move on the smooth path up to the final stop position. This also dispenses with positioning of the machining head in cutting off the hole, i.e. upon completion of cutting off the hole. Therefore, it is no longer necessary to carry out positioning of the machining head two times, thereby making it possible to realize a high-speed cutting process.

However, machining paths along which the running piercing is carried out as described above are complicated, and hence machining programs therefor are also complicated, requiring a long time period for programming.

SUMMARY OF THE INVENTION

The present invention has been made in view of these circumstances, and the object thereof is to provide a laser beam machine which is capable of easily generating a machining path for cutting, which dispenses with positioning of a machining head.

To attain the object, the present invention provides a laser beam machine for cutting a shape of a hole according to a machining program, comprising reading means for reading the shape of the hole, a size of the hole, a central position of the hole, and a start position and a final stop position of a front end point of a machining head, smooth path-generating means for generating a machining path from the shape of the hole, the size of the hole, the central position of the hole, the start position, and the final stop position, such that an overall path for the front end point of the machining head becomes a smooth one, and machining program-generating means for generating the machining program based on the machining path.

The reading means reads the shape of the hole to be cut, the size of the hole, the central position of the hole, and the start position and the final stop position of the front end point of the machining head. The smooth path-generating means generates the machining path from the shape of the hole, the size of the hole, the central position of the hole, the start position, and the final stop position, such that the overall path for the front end point of the machining head becomes a smooth one. The machining program-generating means generates the machining program based on the machining path.

Thus, the smooth path for the front end point of the machining head from the start position to the final stop position thereof is generated from the shape of the hole to be cut, the size of the hole, the central position of the hole, the start position and the final stop position. The size of the hole, the central position of the hole, the start position and the final stop position are data which can be easily input by an operator, based on which the smooth path-generating means automatically generates the smooth machining path. Therefore, it is possible to easily generate a machining program for cutting along the smooth machining path.

DETAILED DESCRIPTION OF THE PREFERRED EMBODIMENTS

The invention will now be described in detail with reference to drawings showing an embodiment of the invention.

Figure 2:
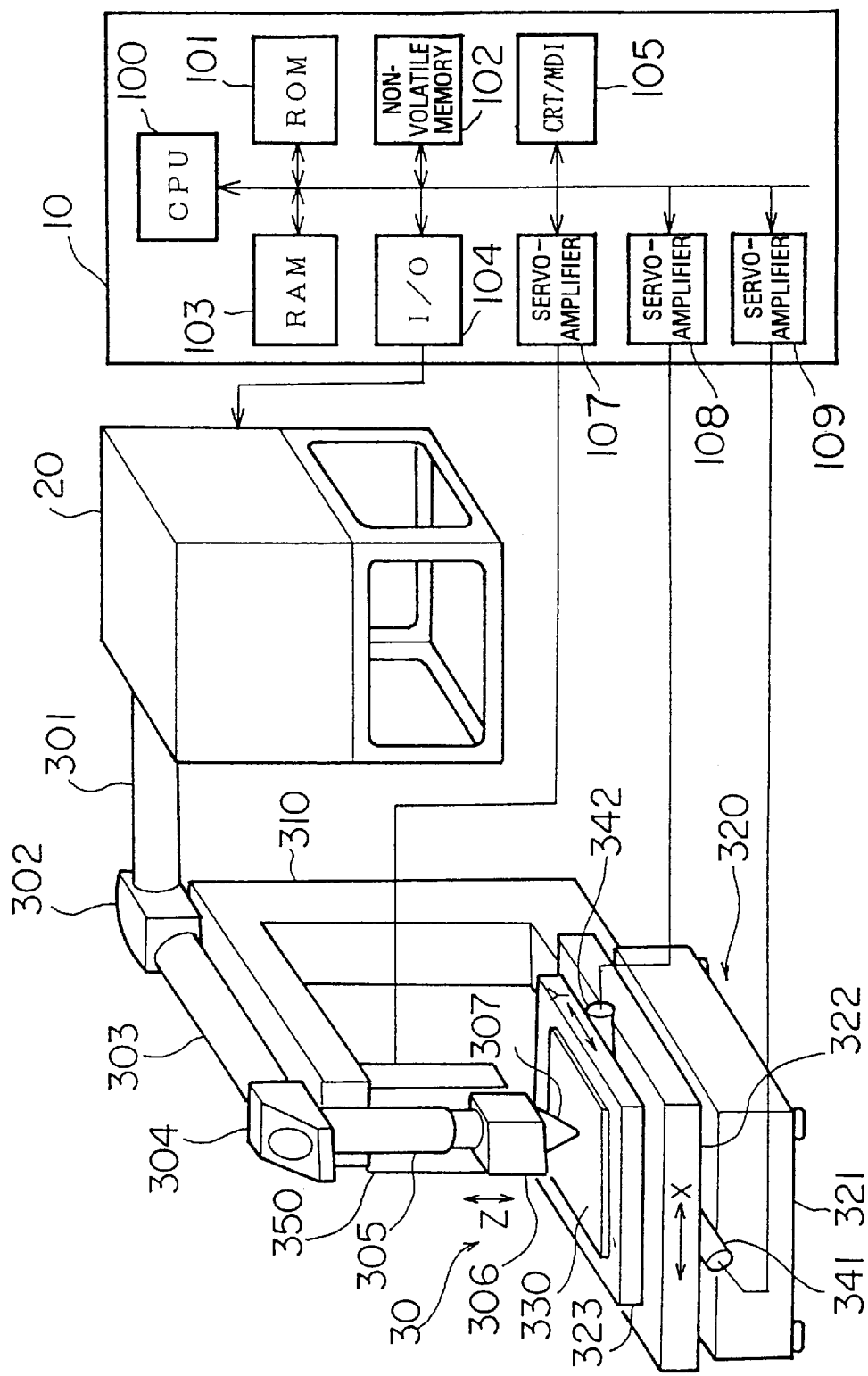
FIG. 2 is a diagram showing the whole arrangement of a laser beam machine according to the invention.

FIG. 2 shows the whole arrangement of a laser beam machine according to the invention. In FIG. 2, the laser beam machine is comprised of a computer numerical control (CNC) unit 10, a laser oscillator 20 and a working machine 30.

The CNC unit 10 is constructed such that a processor 100 forms a central part thereof. As a ROM 101, an EPROM or EEROM is used for storing a system program therein. Further, as a non-volatile memory 102, there is used a CMOS backed up by a battery for retaining a machining program, a smooth path-generating program, various parameters, and so forth, even after the power is turned off.

The processor 100 reads the machining program based on the system program stored in a RAM 103, to control the overall operation of the laser beam machine. Further, the processor 100 causes a machining head 306 to move along a machining path generated based on the program according to the invention to cut a hole through a workpiece 330, details of which will be described later.

The CNC unit 10 also includes an I/O unit 104 for converting a control signal from the processor 100, and delivers the converted control signal to the laser oscillator 20. The laser oscillator 20 emits a pulsed laser beam according to the converted control signal. The pulsed laser beam is transmitted via a light guide passage 301, a mirror unit 302, a light guide passage 303, a mirror unit 304, a light guide passage 305, and the machining head 306, followed by being emitted from a nozzle 307 onto the workpiece 330.

The CNC unit 10 has a CRT/MDI 105 connected thereto, via which various programs and data are input in an interactive manner.

The working machine 30 is comprised of a support frame 310 supporting the light guide passage 303, the mirror units 302, 304, etc., and a table support 320 supporting a table 323. On an open end of the support frame 310 is arranged a machining head-moving mechanism 350. The machining head 306 is arranged at an open end of the light guide passage 305 which is in the form of an extendible telescope, and moved in Z direction according to the rotation of a servomotor provided within the machining head-moving mechanism 350.

A table 322 is arranged on a basis table 321 of the table support 320, and further a table 323 is arranged on the table 322. The tables 322 and 323 are moved in X direction and Y direction by table-moving mechanisms 341 and 342 formed by servomotors provided on respective lower end sides of the tables 322 and 323. The workpiece 330, which is fixed on the table 323, can be freely moved on an X-Y plane.

The servomotors provided for the machining head-moving mechanism 350, and the table-moving mechanisms 341 and 342 are respectively connected to servoamplifiers 107, 108, and 109 provided within the CNC 10, and have their rotations controlled by respective axial control signals from the processor 100. The tables 322, 323, and the machining head 306 are moved according to the rotations of the respective servomotors. The laser beam emitted from the nozzle 307 depicts a locus on the workpiece 330 according to the movements of the tables 322 and 323, thereby cutting the workpiece 330 to a predetermined shape.

Next, description will be made of how a smooth path is generated for cutting a circular hole through the workpiece 330.

Figure 3:
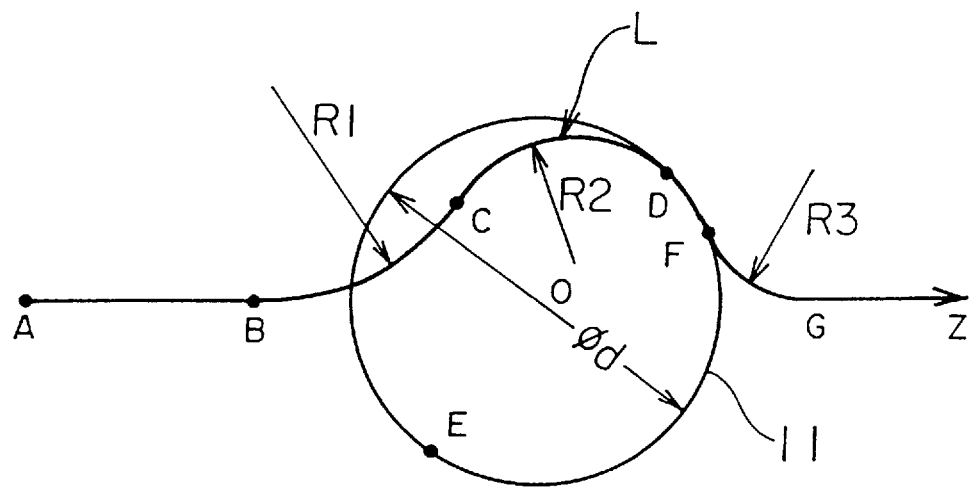
FIG. 3 is a diagram which is useful in explaining how a smooth path is generated by the laser beam machine according to the invention.

FIG. 3 shows how the smooth path is generated according to the invention. Here, description will be made of the case of cutting a circular hole 11 through the workpiece 330. In cutting the circular hole 11, the operator inputs various data known in advance to the CNC 10. That is, a designation code Q for the circular hole, which is to be cut, a size φd of the hole, a central position O of the hole, and a start position A and a final stop position Z of a front end point of the machining head 306. The processor 100 of the CNC 10 reads these various data and generates a smooth path L by the smooth path-generating program. The smooth path L is indicated in FIG. 3 as a line A→B→C→D→E→F→G→Z, and the machining head moves along a smooth path portion from the start position A to a point D on the circular hole 11, from which the machining moves round the periphery of the circular hole. Then, the machining head moves from the point D up to a point F in a partially overlapping manner, and then follows another smooth path portion until it reaches the final stop position Z.

Of the smooth path L, a section from B to C is a circular arc having a radius of R1. The radius R1 is determined as φd×0.7. Next, a section from C to D is a circular arc having a radius of R2. The radius R2 is determined as φd×0.35. The overlapping section from D to F is set e.g. to 3.0 mm. A circular arc from F to G following the overlapping section has a radius of R3. The radius R3 is determined as φd×0.35, similarly to the radius R2.

Based on the smooth path L thus determined, the processor 100 of the CNC 10 further generates the machining program. That is, the processor 10 generates the machining program by adding, to data of coordinates designating the smooth path L, an instruction of the running piercing for the section from C to D, laser output instructions for the sections C→D→E→F, and instructions of feed rates of the machining head over the whole smooth path L. The machining program is once stored into the CNC 10, and then read out upon machining to carry out cutting by laser beam.

Thus, in the present embodiment, the smooth path L for the front end point of the machining head 306 from the start position A to the final stop position Z is generated from the designation code Q for the shape of the hole, the size φd of the hole, the central position O of the hole, the start position A and the final stop position Z. These data Q, φd, O, A, and Z are data which can be easily input by the operator, and the smooth path L is automatically generated based on these data. Therefore, it is possible to generate the machining program for cutting along the smooth path, with ease in a short time period.

In the cutting process carried out based on this machining program, piercing is completed during movement of the machining head 306 from the point C to the point D. Further, stoppage of the laser output is completed during movement of the machining head 306 from the point D to the point F. Therefore, it is possible to cut the hole without stopping the machining head even once, thereby enabling a high-speed cutting to be realized.

Figure 4:
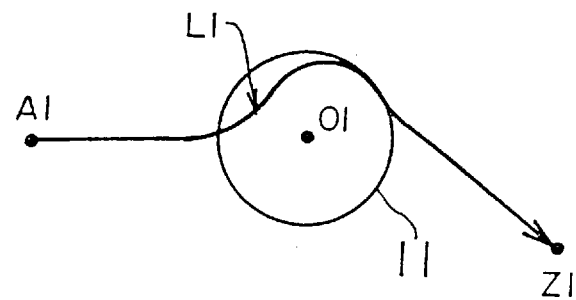
FIG. 4 (a), FIG. 4 (b), FIG. 4 (c), and FIG. 4 (d) show two kinds of form of the smooth path, in which FIG. 4 (a), FIG. 4 (b), and FIG. 4 (c) show a first form, and FIG. 4 (d) shows a second form.
Figure 4:
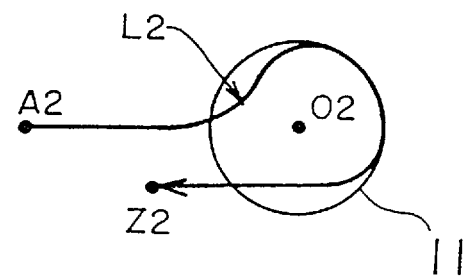
Figure 4:
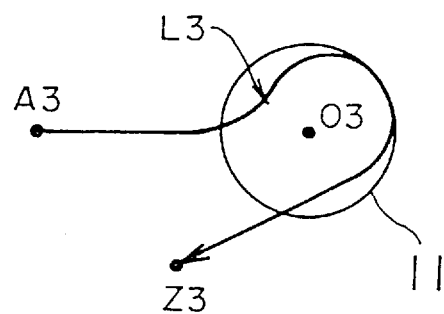
Figure 4:
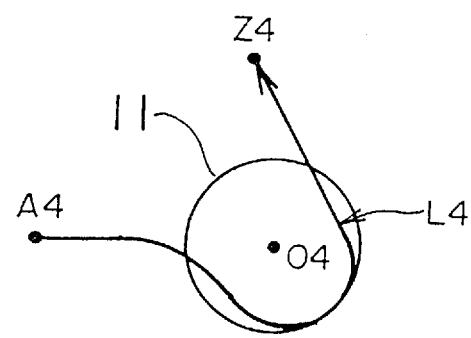

The above smooth path L has two kinds of form, as shown in FIG. 4 (a), FIG. 4 (b), FIG. 4 (c), and FIG. 4 (d), depending on the positional relationship between the start position A, the central position O, and the final stop position Z.

FIG. 4 (a), FIG. 4 (b), FIG. 4 (c), and FIG. 4 (d) are figures showing two kinds of form of the smooth path. FIG. 4 (a), FIG. 4 (b) and FIG. 4 (c) show the first form, and FIG. 4 (d) shows the second form. In the FIG. 4 (a) example, a final stop position Z1 is located below an extension of a line connecting between a start position A1 and a central position O1. In such a case, a smooth path L1 is generated in a clockwise (CW) direction. In the case of FIG. 4(b) and FIG. 4 (c), similarly to the case of FIG. 4 (a), final stop positions Z2 and Z3 are located below lines connecting between start positions A2 and A3 and central positions O2 and O3, respectively. Therefore, smooth paths L2 and L3 are generated in clockwise (CW) directions.

In contrast, in the FIG. 4 (d) example, a final stop position Z4 is located above a line connecting between a terminal point A4 and a central position O4. In such a case, a smooth path L4 is generated in a counterclockwise (CCW) direction.

Figure 5:
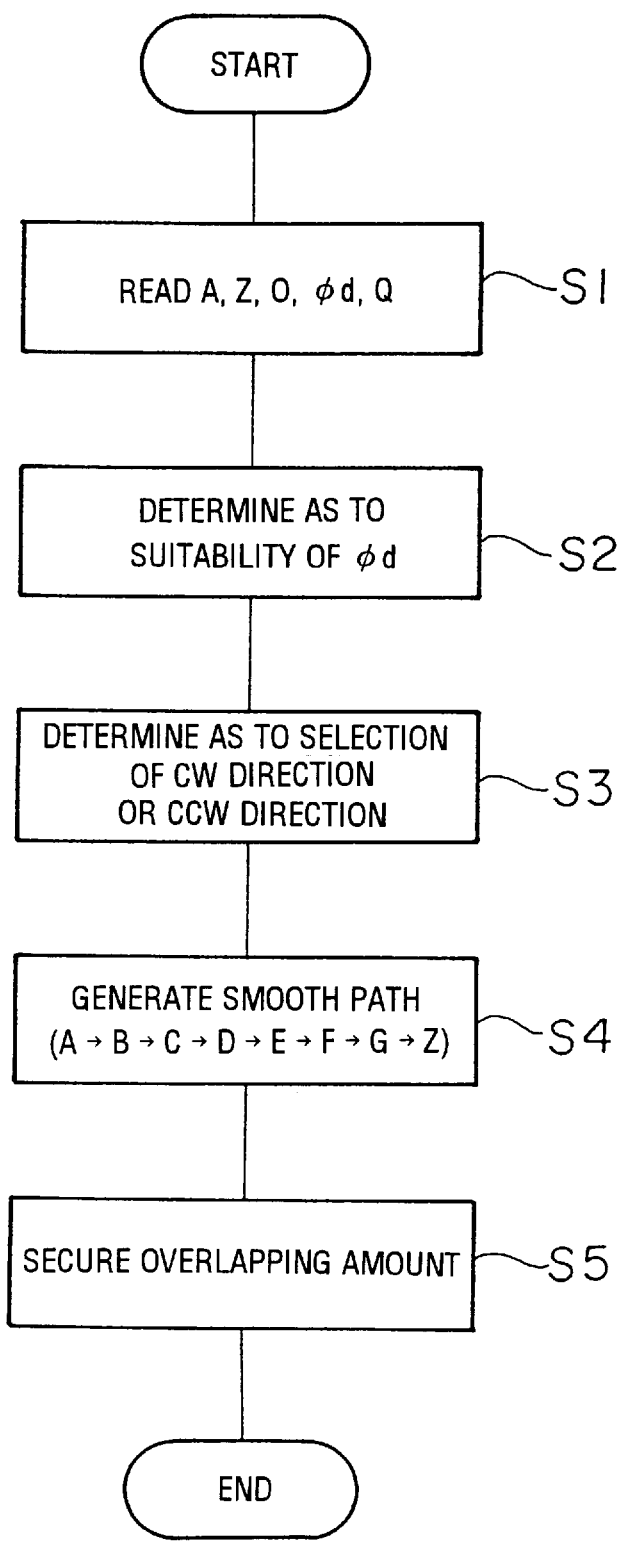
FIG. 5 is a flowchart for generating a smooth path, according to the invention.

FIG. 5 is a diagram showing a flowchart for generating a smooth path by the laser beam machine according to the invention. In the figure, numerals following S designate step numbers.

[S1] A start position A, a final stop position Z of the front end point of the machining head 306, a central position O of a hole to be cut, the size φd of the hole, and a designation code Q for the hole are read.

[S2] It is determined whether or not the size φd is suitable for generating the smooth path. If the size φd is outside a predetermined range, the machining path is generated by a conventional method.

[S3] It is determined from the positional relationship between the start position A, the central position O and the final stop position Z whether the smooth path L should extend in the CW direction or in the CCW direction.

[S4] The smooth path L is generated from the start position A, the final stop position Z, the central position O of the hole, the size φd of the hole, and the designation code Q for the shape of the hole.

[S5] It is confirmed whether or not an overlapping amount, for example, of 3 mm in the case of FIG. 3 is allocated. If the overlapping amount is not allocated, the point F is corrected to a point which is away from the point D by the overlapping amount, and then the circular arc F to G is determined again.

Figure 6:
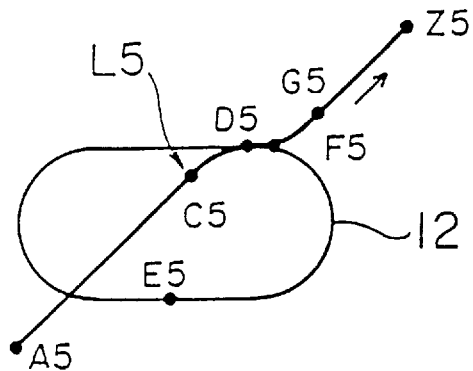
FIG. 6 (a) and FIG. 6 (b) show examples of the smooth path for cutting holes other than circular holes, in which FIG. 6 (a) shows a case of cutting a slot, and FIG. 6 (b) a case of cutting a square hole.
Figure 6:
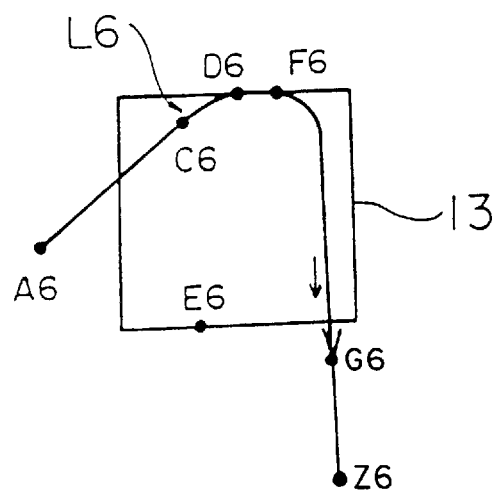
Figure 7:
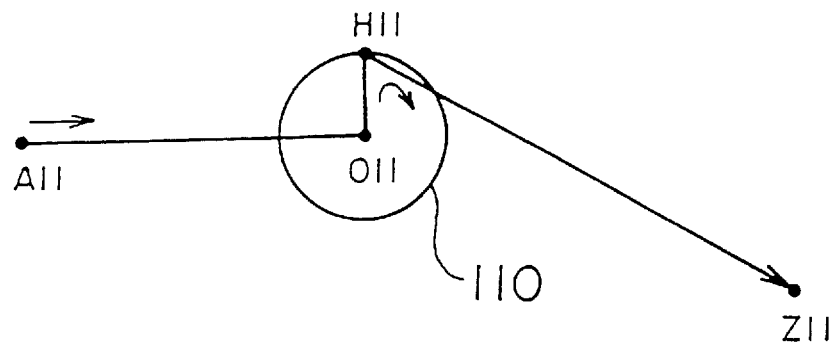
FIG. 7 (a) and FIG. 7 (b) show examples of conventional machining paths for cutting circular holes, in which FIG. 7 (a) shows a first one, and FIG. 7 (b) a second one.
Figure 7:
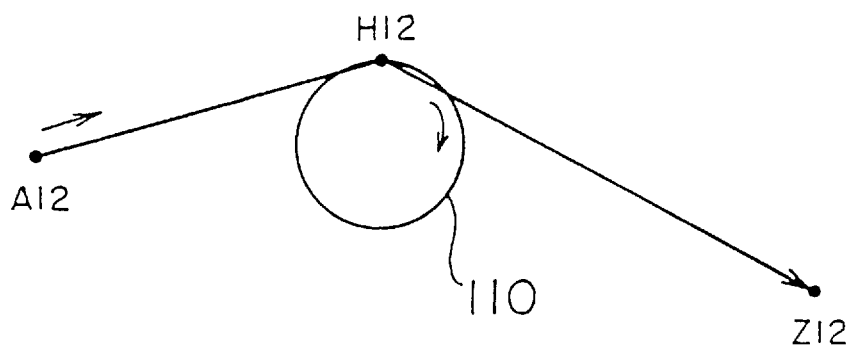
Figure 8:
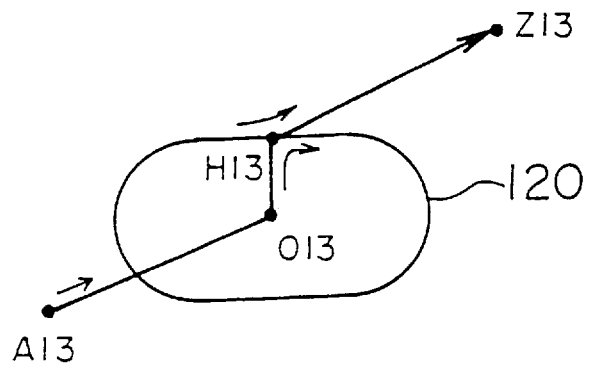
FIG. 8 (a) and FIG. 8 (b) show examples of conventional machining paths for cutting a slot and a square hole, in which FIG. 8 (a) shows a case of cutting a slot, and FIG. 8 (b) a case of cutting a square hole.
Figure 8:
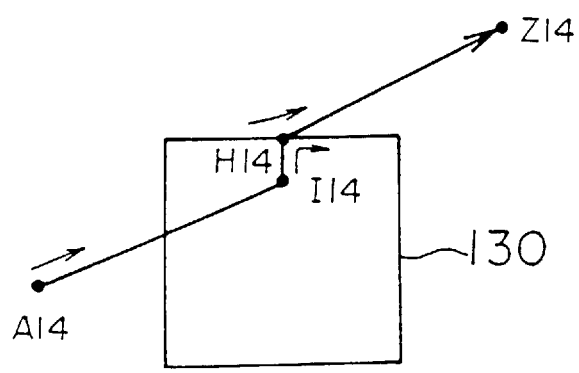

FIG. 6 (a) and FIG. 6 (b) show examples of the smooth generated in cutting holes other than circular holes, in which FIG. 6 (a) shows an example of the smooth path for the slot, and FIG. 6 (b) shows an example of the smooth path for square hole. As shown in FIG. 6 (a) and FIG. 6 (b), even if the hole to be cut is a slot 12, or a square hole 13, smooth paths L5 and L6 are generated in the same manner as the circular hole 11 as described above. That is, the smooth path L5 for the slot 12 is generated as A5→C5→D5→E5→D5→F5→G5→Z5, and the smooth path L6 for the square hole 13 is generated as A6→C6→D6→E6→D6→F6→G6→Z6. In addition, although the diameter φd is used as a size of the circular hole 11, in the case of the slot 12, it is only required to set e.g. the length of the longitudinal axis thereof, to the size of the hole. Further, with the square hole 13, it is only required to set e.g. the diagonal length of the square hole to the size of the hole to be cut.

Figure 1:
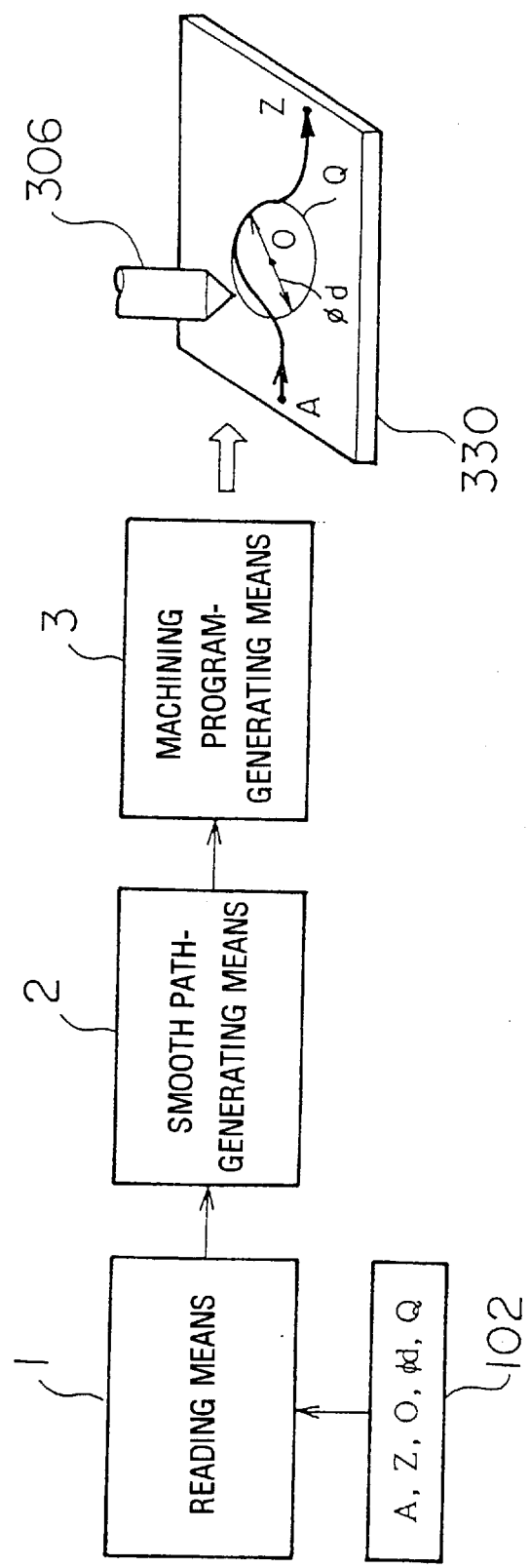
FIG. 1 is a diagram showing construction of the invention.

FIG. 1 is a block diagram showing a construction of the present invention. In FIG. 1, reading means 1 reads the designation code Q for the shape of a hole to be cut, the size φd of the hole, the central position O of the hole, and the start position A and the final stop position Z of the front end point of the machining head 306. Smooth path-generating means 2 generates a smooth path L from the designation code Q for the shape of the hole, the size φd of the hole, the central position O of the hole, the start position A, and the final stop position Z, such that the whole path for the front end point of the machining head 306 forms a smooth one. Machining program-generating means 3 generates a machining program based on the smooth path L thus generated. According to machining program, the machining head 306 moves to cut the hole through the workpiece 330.

Although, in the above description, generation of the smooth path L is carried out by the CRT/MDI 105 within the CNC 10, this is not limitative, but the smooth path L may be generated by a peripheral arithmetic unit outside the CNC 10, and then data of the smooth path L may be transferred to the CNC 10 by the use of a floppy disk.

As described heretofore, according to the invention, the smooth path for the front end point of the machining head extending from a start position to a final stop position is generated based on the shape of a hole to be cut, the size of the hole, the central position of the hole, the start position and the final stop position. These data can be easily input by an operator, based on which the smooth path L is generated automatically. Therefore, it is possible to generate a machining program for cutting along the smooth path, with ease in a short time period.

In the cutting process carried out according to the machining program, piercing and stoppage of laser output are completed during movement of the machining head, which makes it possible to cut a hole without stopping the machining head even once, thereby realizing a high-speed cutting.

We claim:

1. A laser beam machine for cutting a shape of a hole in a work piece according to a machining program, comprising:

a machining head having a front end point to emit a laser beam onto a workpiece;

reading means for reading said shape of said hole, a size of said hole, a central position of said hole, and a start position and a final stop position of said front end point of said machining head;

path-generating means for generating a machining path formed by segments and circular arcs adjoining one another, wherein said circular arcs are generated by multiplying said size of said hole by predetermined coefficients to approach said hole in an arc before cutting, cut said shape of said hole and move away from said hole in an arc after cutting, based on said shape of said hole, said size of said hole, said central position of said hole, said start position, and said final stop position read by said reading means, the machining head and the work piece being moved relative one another along the machining path under the control of the machining program; and machining program-generating means for generating said machining program based on said machining path.

2. A laser beam machine according to claim 1, wherein when said shape of said hole is a circular hole, said size of said hole is a diameter of said circular hole.

3. A laser beam machine according to claim 1, wherein said machining program-generating means generates said machining program such that said machining head does not stop through the whole process from said start position to said final stop position.

4. A laser beam machine according to claim 1, wherein said path-generating means allocates an overlapping section to part of said machining path along said shape of said hole.

5. A laser beam machine according to claim 1, wherein said path-generating means is provided within a numerical control unit or a peripheral arithmetic unit outside said numerical control unit.

6. A laser beam machine according to claim 1, wherein the hole is circular and the path-generating means generates the machine path to tangentially approach and move away from the circular hole.

7. A laser beam machine for cutting a shape of a hole in a work piece according to a machining program, comprising:

a machining head having a front end point to emit a laser beam onto a workpiece;

reading means for reading said shape of said hole, a size of said hole, a central position of said hole, and a start position and a final stop position of said front end point of said machining head;

path-generating means for generating a machining path to approach said hole in an arc before cutting, cut said shape of said hole and move away from said hole in an arc after cutting, based on said shape of said hole, said size of said hole, said central position of said hole, said start position, and said final stop position read by said reading means, the machining head and the work piece being moved relative one another along the machining path under the control of the machining program, wherein said path generating means allocates an overlapping section to part of said circular hole; and machining program-generating means for generating said machining program based on said machining path such that irradiation of said laser beam from said machining head is stopped during a time period that said machining head passes along said overlapping section.

8. A laser beam machine according to claim 7, wherein said machining path is formed by segments and circular arcs, and said segments and said circular arcs are generated such that said segments and said circular arcs adjoin one another.

9. A laser beam machine according to claim 8, wherein said path-generating means generates said circular arcs by multiplying said size of said hole by predetermined coefficients.

10. A laser beam machine according to claim 7, wherein when said shape of said hole is a circular hole, said size of said hole is a diameter of said circular hole.

11. A laser beam machine according to claim 7, wherein said machining program-generating means generates said machining program such that said machining head does not stop through the whole process from said start position to said final stop position.

12. A laser beam machine according to claim 7, wherein said path-generating means is provided within a numerical control unit or a peripheral arithmetic unit outside said numerical control unit.

13. A laser beam machine according to claim 7, wherein the hole is circular and the path-generating means generates the machine path to tangentially approach and move away from the circular hole.

* * * * *